US009928397B2

(12) United States Patent
Lu (10) Patent No.: US 9,928,397 B2
(45) Date of Patent: Mar. 27, 2018

(54) METHOD FOR IDENTIFYING A TARGET OBJECT IN A VIDEO FILE

(71) Applicants: Bravo Ideas Digital Co., Ltd., Tortola (VG); Yi-Chih Lu, Taipei (TW)

(72) Inventor: Yi-Chih Lu, Taipei (TW)

(73) Assignees: Bravo Ideas Digital Co., Ltd., Road Town, Tortola (VG); Yi-Chih Lu, Taipei (TW)

( * ) Notice: Subject to any disclaimer, the term of this patent is extended or adjusted under 35 U.S.C. 154(b) by 10 days.

(21) Appl. No.: 15/176,636

(22) Filed: Jun. 8, 2016

(65) Prior Publication Data

US 2017/0140541 A1 May 18, 2017

(30) Foreign Application Priority Data

Nov. 18, 2015 (TW) .............................. 104137999 A (51) Int. Cl.
*G06K 9/00* (2006.01)
*H04N 21/234* (2011.01)
(Continued)

(52) U.S. Cl.
CPC ......... *G06K 9/00* (2013.01); *H04N 21/23418* (2013.01); *H04N 21/4725* (2013.01);
(Continued)

(58) Field of Classification Search
CPC ........... A47F 2007/195; G06F 17/5009; G06F 2217/32; G06F 17/30047; G06F 17/30864; G06F 17/30867; G06T 13/20; G06T 19/006; G06T 2210/16; G06T 2200/04; G06T 7/0046; G06T 7/0067; G06T 11/003; G06T 11/006; G06T 2207/10081; G06T 2207/10088; G06T 2207/10104; G06T 2207/30024; G06T 7/20; G06T 9/001; G06T 9/20; G06T 2207/10016; G06T 2207/30236; G06T 7/246; G06T 7/251; G06T 2207/30261; G06T 7/215; G06T 7/277; G06T 7/337; G06T 7/35; G06T 2207/20101; G06T 7/12; G06T 7/19;
(Continued)

(56) References Cited

U.S. PATENT DOCUMENTS

| | | | | |
|---|---|---|---|---|
| 5,706,419 A * | 1/1998 | Matsugu | ................. | G06T 17/00 345/420 |
| 5,999,651 A * | 12/1999 | Chang | ..................... | G06T 7/251 382/199 |
| 6,332,038 B1 * | 12/2001 | Funayama | ............. | H04N 5/262 348/135 |
| 9,317,927 B2 * | 4/2016 | Hamarneh | ............ | G06T 7/0097 |
| 9,641,794 B2 * | 5/2017 | Wang | ..................... | H04N 5/911 |
| 2001/0040924 A1 * | 11/2001 | Hori | ........................ | G06T 7/246 375/240.16 |
| 2002/0063718 A1 * | 5/2002 | Choi | ................. | G06F 17/30259 345/581 |
| 2003/0086492 A1 * | 5/2003 | Hori | ........................ | G06T 7/20 375/240.08 |
| 2006/0202986 A1 * | 9/2006 | Okada | ................. | G06F 17/5009 345/419 |
| 2006/0262112 A1 * | 11/2006 | Shimada | ................. | G06T 17/00 345/419 |

(Continued)

*Primary Examiner* — Aklilu Woldemariam
(74) *Attorney, Agent, or Firm* — Trop Pruner & Hu, P.C.

(57) ABSTRACT

A method for identifying a target object in a video file is implemented using an identification system. In the method, the identification system is programmed to: obtain a video file and an image; obtain a target object in the image; construct an image model based on a feature of the target object; extract key frames from the video file sequentially; perform a comparing procedure for each key frame to determine whether the key frame includes a similar object corresponding to the image model; and for each key frame, extract from the key frame, when the determination is affirmative, a part of the key frame that contains the similar object to obtain a target image, presence of the target image indicating that the target object is identified in the video file.

11 Claims, 9 Drawing Sheets

(51) Int. Cl.
*H04N 21/4725* (2011.01)
*H04N 21/658* (2011.01)
*H04N 21/81* (2011.01)
*H04N 21/845* (2011.01)
*H04N 7/18* (2006.01)

(52) U.S. Cl.
CPC ..... *H04N 21/6582* (2013.01); *H04N 21/8133* (2013.01); *H04N 21/8456* (2013.01); *H04N 7/18* (2013.01)

(58) Field of Classification Search
CPC . G06T 2207/30004; G06T 2207/30201; G06T 3/0068; G06T 7/248; G06T 7/55; G06T 9/00; G06T 11/60; G06T 2207/10004; G06T 7/33; G06T 7/75; G06T 17/20; G06T 2207/10012; G06T 2207/30164; G06T 7/00; H04N 19/20; H04N 19/537; H04N 5/262; H04N 5/272; G06K 9/4604; G06K 9/4609; G06K 9/00234; G06K 9/00624; G06K 9/4647; G06K 2209/40; G06K 9/20; G06K 2009/487; G06K 9/00214; G06K 9/00281; G06K 9/48; G06K 9/6211; G06K 9/00711; G06K 9/40; G06K 9/4671; G06K 9/00208; G06K 9/00758; G06K 9/6201; G06Q 30/00

USPC ....... 382/103, 141, 142, 143, 144, 145, 216, 382/291; 345/419; 375/240
See application file for complete search history.

(56) References Cited

U.S. PATENT DOCUMENTS

| | | | |
|---|---|---|---|
| 2007/0003165 A1* | 1/2007 | Sibiryakov | G06K 9/6211 382/294 |
| 2009/0116766 A1* | 5/2009 | Matsumoto | G06T 19/00 382/311 |
| 2009/0248175 A1* | 10/2009 | Eguchi | G05B 13/048 700/30 |
| 2012/0082370 A1* | 4/2012 | Yasukawa | G06T 7/0028 382/154 |
| 2014/0009573 A1* | 1/2014 | Fujita | A61B 6/14 348/36 |
| 2014/0072208 A1* | 3/2014 | Kenyon | G06K 9/80 382/159 |
| 2014/0228118 A1* | 8/2014 | Hardy | G06T 19/006 463/31 |
| 2014/0321703 A1* | 10/2014 | Inomata | G06K 9/00624 382/103 |
| 2016/0174919 A1* | 6/2016 | Ahn | G01T 1/1603 382/131 |
| 2017/0094194 A1* | 3/2017 | Adsumilli | H04N 5/272 |
| 2017/0140541 A1* | 5/2017 | Lu | G06K 9/00 |

* cited by examiner

METHOD FOR IDENTIFYING A TARGET OBJECT IN A VIDEO FILE

CROSS-REFERENCE TO RELATED APPLICATION

This application claims priority of Taiwanese Patent Application No. 104137999, filed on Nov. 18, 2015.

FIELD

The disclosure relates to a method for identifying a target object in a video file.

BACKGROUND

U.S. Patent Application Publication No. 2015058160 discloses a method and system for recommending online products. In the method, when a query product image is received, the system extracts color features of the query product image and finds matched product images, which are similar in terms of color matching, among a plurality of product images for recommendation.

Specifically, the system looks up in a database of product images and compares the color features of the query product image and the color features of the product images, order to pick up matched product images. Machine learning may be employed to increase efficiency of the above processes.

SUMMARY

An object of the disclosure is to provide a method identifying a target object in a video file.

According to one embodiment of the disclosure, the method is implemented using an identification system and includes the steps of:

a) obtaining a video file and an image;

b) performing edge detection on the image so as to obtain a target object;

c) detecting at least one feature of the target object and constructing an image model based on the at least one feature of the target object;

d) extracting a plurality of key frames from the video file sequentially;

e) performing a comparing procedure for each of the plurality of key frames to make a determination as to whether the key frame includes a similar object that corresponds to the image model; and f) for each of the plurality of key frames, extracting from the key frame, when a result of the determination made in step e) is affirmative, a part of the key frame that contains the similar object to obtain a target image, presence of the target image indicating that the target object is identified in the video file.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
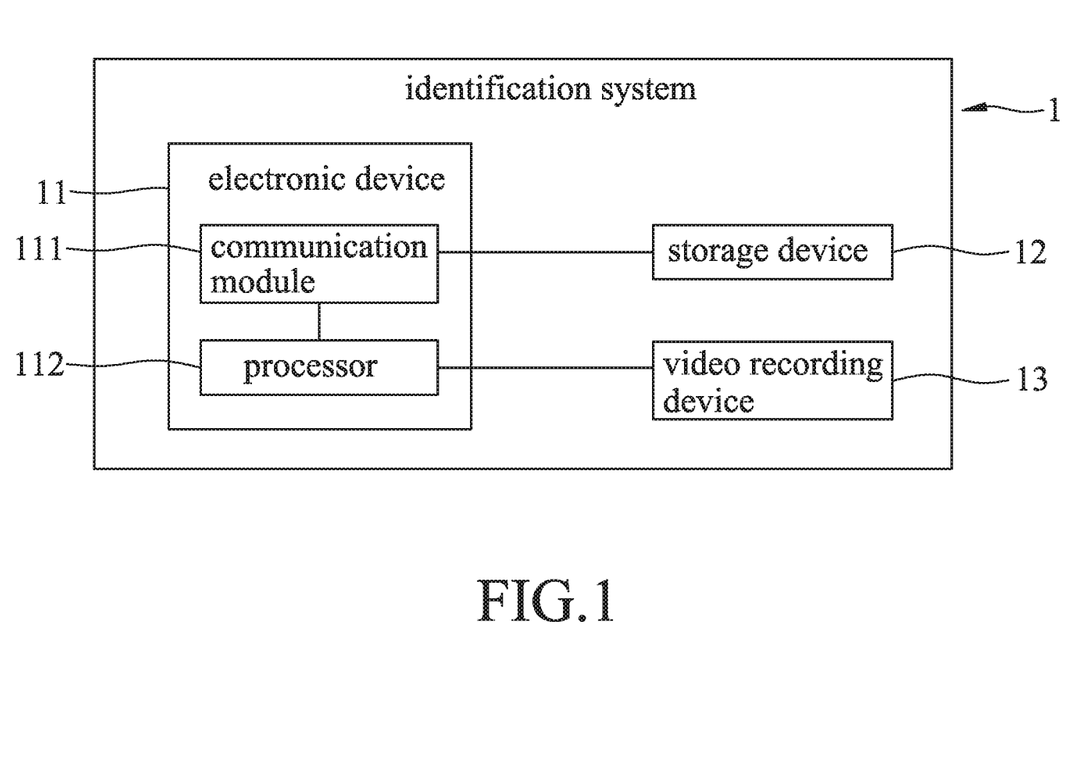
FIG. 1 is a block diagram illustrating an identification system, according to one embodiment of the disclosure.

FIG. 1 illustrates an identification system 1, according to one embodiment of the disclosure. The identification system 1 includes an electronic device 11, a storage device 12 and a video recording device 13.

In this embodiment, the electronic device 11 may be embodied using a personal computer, a portable electronic device (such as a laptop computer, a tablet computer having a touch screen, etc.), or a mobile device (such as a smartphone, a personal digital assistant, etc.). The electronic device 11 includes a communication module 111 and a processor 112.

The storage device 12 may be embodied using a hard disk drive, a flash drive, a portable storage drive, and may be integrated in the electronic device 11 or removably connected to the electronic device 11. In one embodiment, the storage device 12 may be embodied using a cloud drive that is capable of communicating with the electronic device 11 via a network.

The video recording device 13 may be integrated in the electronic device 11 or removably connected to the electronic device 11 via a network, and is capable of recording a video file.

Figure 2:
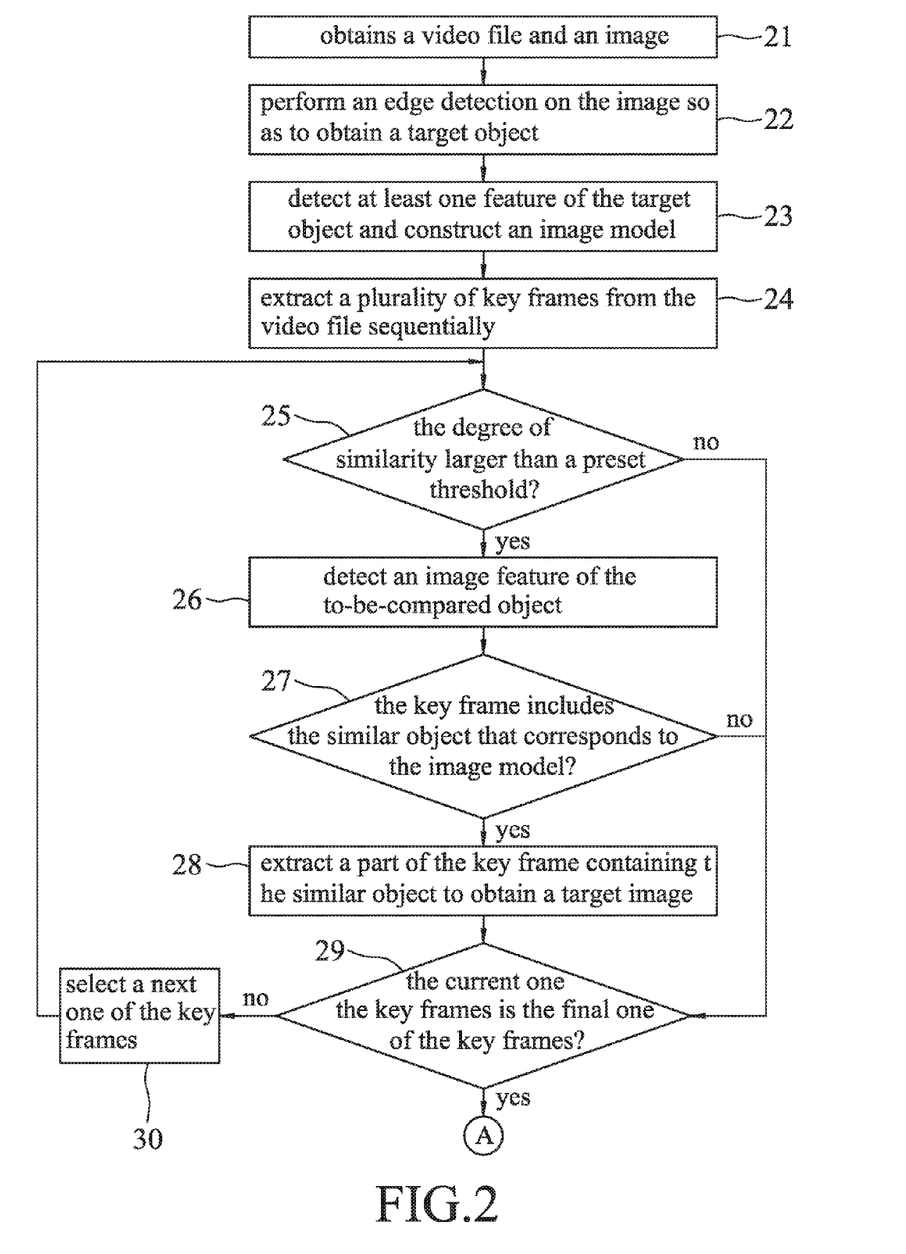
FIG. 2 is a flow chart illustrating steps of a method for identifying a target object in a video file to be implemented by the identification system, according to one embodiment of the disclosure.

FIG. 2 illustrates steps of a method implemented by the identification system 1 for identifying a target object in a video file, according to one embodiment of the disclosure. Reference is now made to FIGS. 1 to 5.

In step 21, the electronic device 11 of the identification system 1 obtains a video file 4 and an image 51.

Specifically, the video file 4 may be recorded by the video recording device 13, or may be obtained from a storage medium external to and coupled with the electronic device 11 (e.g., the storage device 12, a cloud drive, etc.).

The video file 4 may be in various formats such as flash video (.flv, .f4v), H.26x coding standard (H.263, H.264), RealMedia (.rm), Advanced System Format (.wmv), Apple M4V file format (.M4V), Quicktime Movie (.mov), WebM file format (.webm), etc.

The image 51 may be obtained in a number of ways. For example, a user operating a separate electronic device may upload the image to the identification system 1. Additionally, the image 51 may be obtained from a storage medium external to and coupled with the identification system 1, or via a link provided by the user. In one embodiment, the image 51 is a three-dimensional image. The image may be in a format of, for instance, .bmp, .gif, .jpg, .jpeg, .png, or .tif.

In step 22, the processor 112 of the electronic device 11 performs edge detection on the image 51 so as to obtain a target object 511.

In particular, the edge detection may be referred to as a set of algorithms employed for detecting a plurality of points in the image 51. The plurality of points then serve as an edge defining the target object 511.

In step 23, the processor 112 detects at least one feature of the target object 511, and constructs an image model 6 based on the at least one feature of the target object 511.

In particular, in the process of detecting the at least one feature, a local feature detector algorithm, such as speeded up robust features (SURF), may be employed. The SURF causes the processor 112 to perform image transformations, in order to locate scale-invariant characteristic points of the target object 511. Afterward, a descriptor of the at least one feature, such as a set of features vector, may be obtained.

Figure 3:
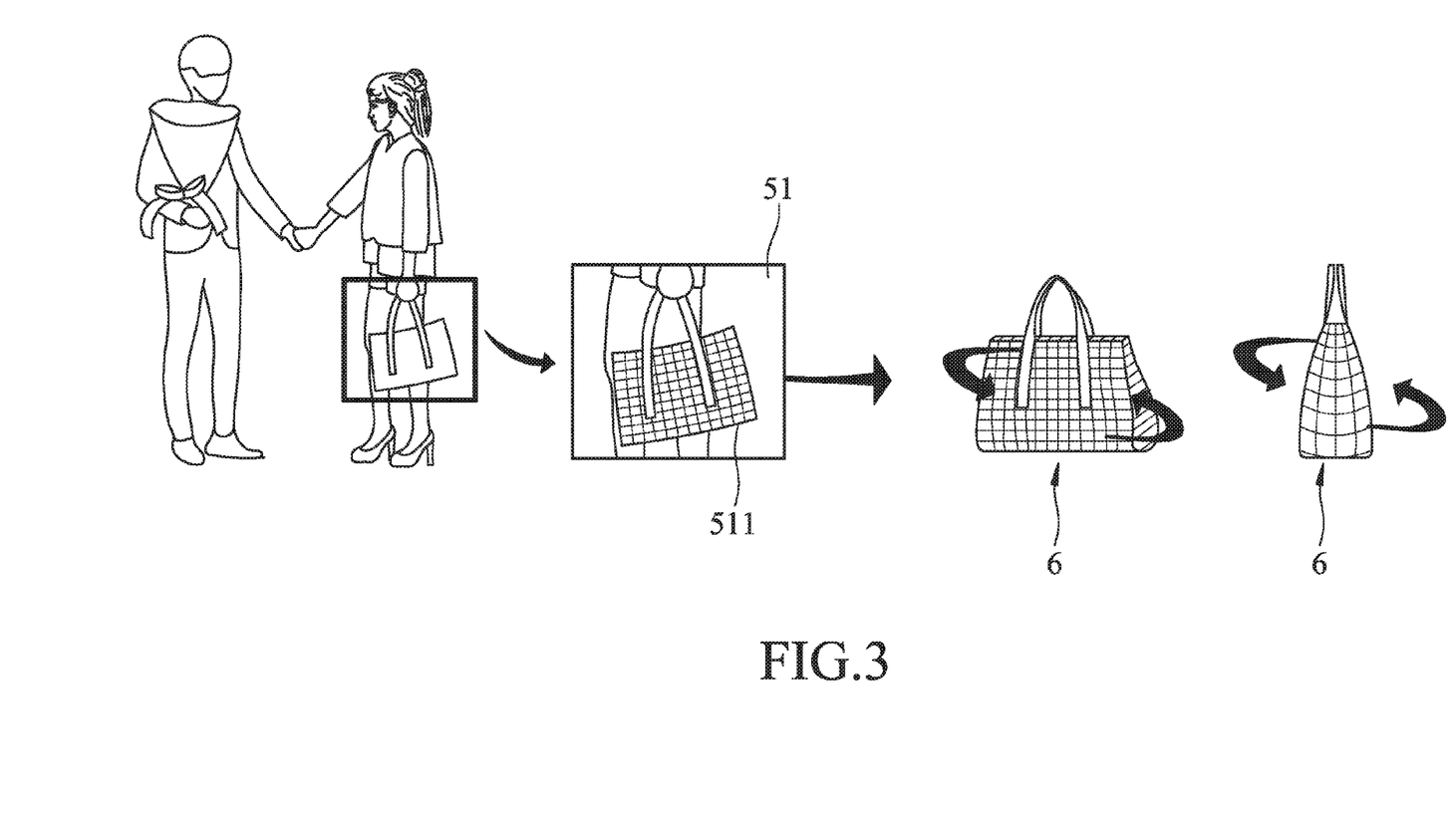
FIG. 3 illustrates an image, a target object obtained from the image, and an image model constructed based on the target object.

Referring to FIG. 3, in this embodiment, an image 51 showing a person holding a handbag (which may be detected to serve as the target object 511) is provided. In this instance, the image 51 is a portion cut out from a larger image. The image model 6 of the target object 511 is a three-dimensional model constructed using a 3D reconstruction process. That is to say, the image model 6 may be observed at an arbitrary angle. Moreover, a contour of the image model 6 is also obtained.

In step 24, the processor 112 extracts a plurality of key frames from the video file 4 sequentially. For each of the plurality of key frames, the processor 112 further stores a time instance of the key frame associated with the video file 4.

The key frames may be ones that indicate the beginning and/or the end of a transition in a video represented by the video file 4.

Figure 4:
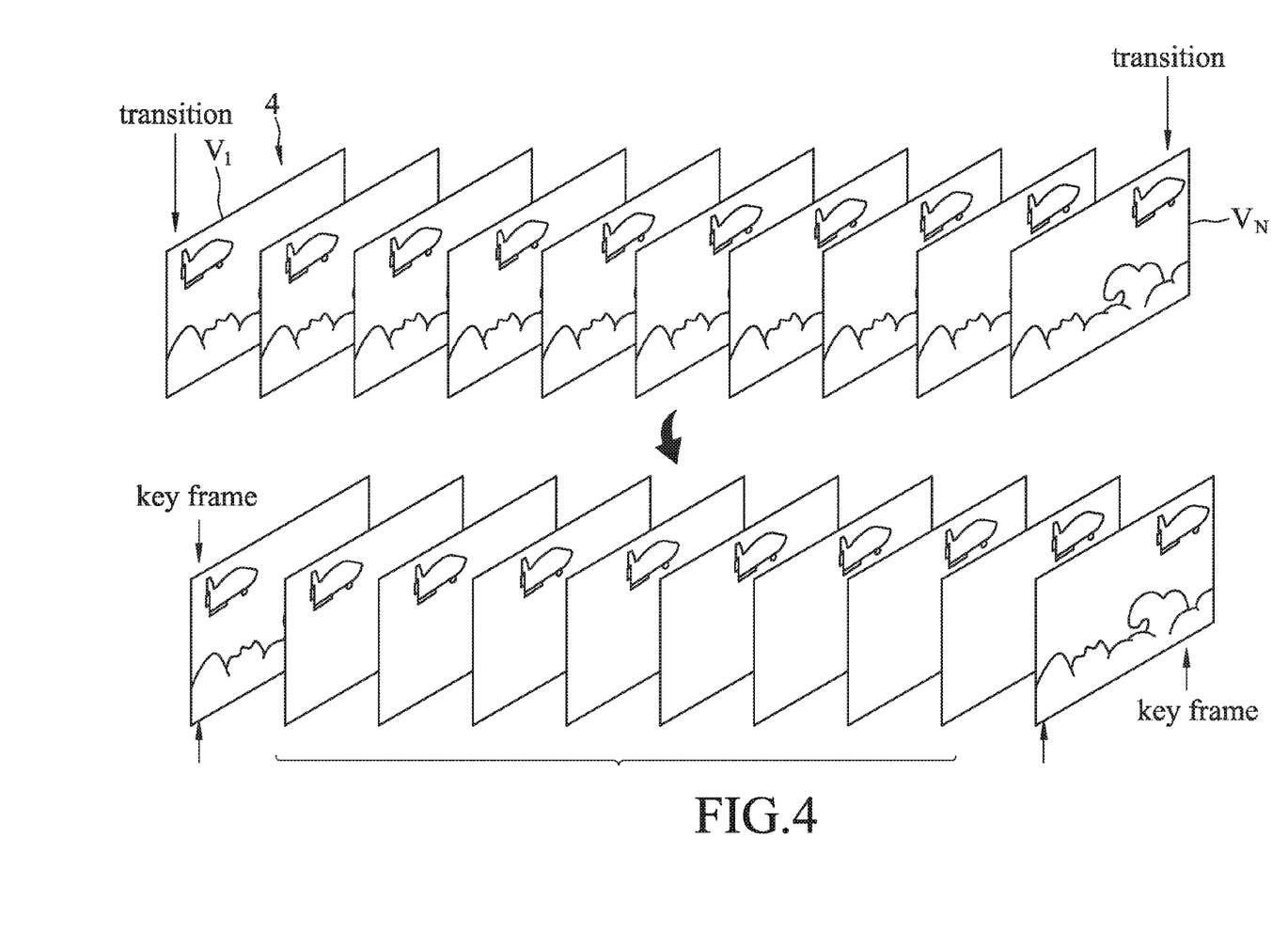
FIG. 4 illustrates an exemplary video file and certain frames being selected and extracted as key frames.

For example, in one exemplary video file, string of frames with relatively small differences therebetween is provided (see the upper part of FIG. 4). In this example, the first one and the last one of the frames, represented by ($V_1$) and ($V_N$), are selected and extracted as key frames (see the lower part of FIG. 4).

After the key frames are extracted, the processor 112 performs a comparing procedure for each of the plurality of key frames to make a determination as to whether the key frame includes a similar object that corresponds to the image model (i.e., an object similar to the target object with which the image model 6 is associated).

Specifically, the comparing procedure for each of the plurality of key frames includes the following steps.

In step 25, when there exists a to-be-compared object in the key frame, the processor 112 calculates a degree of similarity between the to-be-compared object and the contour of the image model 6. It is noted that such operations may be well appreciated by ones skilled in the art, and details thereof are omitted herein for the sake of brevity.

When it is determined that the degree of similarity is larger than a preset threshold, in step 26, the processor 112 detects an image feature of the to-be-compared object. In this embodiment, the preset threshold is 50%. Otherwise, the flow proceeds to step 29. It is noted that the manner in which the processor 112 detects an image feature of the to-be-compared object may be similar to that for detecting the at least one feature of the target object 511.

In step 27, the processor 112 compares the image feature of the to-be-compared object and the image model 6. Specifically, the comparing procedure is performed for determining whether the key frame includes the similar object that corresponds to the image model 6, which is a three-dimensional model, observed at any angle.

When it is determined that the image feature of the to be compared object conforms with the image model 6, in step 28, the processor 112 labels the to-be-compared object as the similar object, and extracts from the key frame a part of the key frame that contains the similar object to obtain a target image 52.

Specifically, since the target image 52 contains the similar object 41, it can be said that presence of a target image 52 indicates that the target object 511 is identified in the video file 4.

Figure 5:
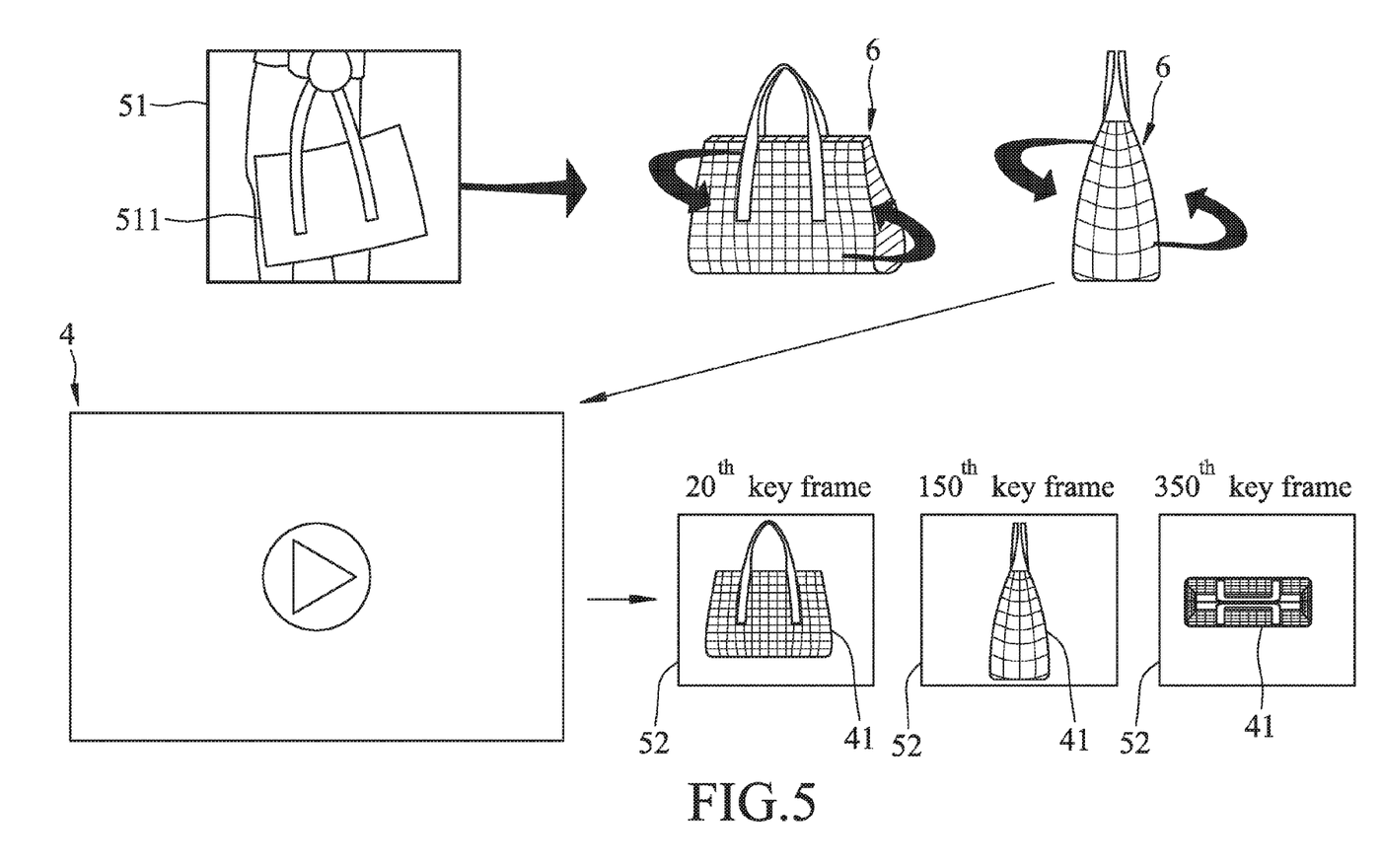
FIG. 5 illustrates a comparing procedure for each of the key frames, according to one embodiment of the disclosure.

Referring to FIG. 5, in one example, three hundred and fifty (350) key frames are extracted from the video file 4, and the target object 511 is a handbag. The image model 6 contains information regarding the handbag observed at an arbitrary angle. In the comparing procedure, the $20^{th}$ key frame contains a to-be-compared object, and the processor 112 determines that the to-be-compared object corresponds to the image model 6 observed at a front angle. Therefore, the $20^{th}$ key frame is determined to contain a similar object 41, and subsequently employed to extract a target image 52.

Thereafter, each of the $150^{th}$ and $350^{th}$ key frames is also determined as containing a to-be-compared object, and the processor 112 determines that the to-be-compared objects contained therein correspond to the image model 6 observed at a side angle and a bottom angle, respectively. Therefore, two more target images 52 may be extracted.

In addition, the processor 112 may obtain a time point of the target image 52 within the video file 4, based on the time instance of the key frame.

In step 29, the processor determines whether the current one the key frames is the final one of the key frames. When it is determined that the current one the key frames is the final one of the key frames, the method is terminated. Otherwise, the flow proceeds to step 30 to select a next one of the key frames, and goes back to step 25 to perform the comparing procedure again.

In use, the method may be employed in various applications. For example, when it is desired to locate a vehicle, the target object 51 may be a registration plate of the vehicle, and the video file 4 may be video footage recorded by a traffic monitoring system. Similarly, when it is desired to locate a person, the target object 51 may be a human face.

In one embodiment, the target image 52 extracted may be used along with the video file 4 for creating a merged video file.

Figure 6:
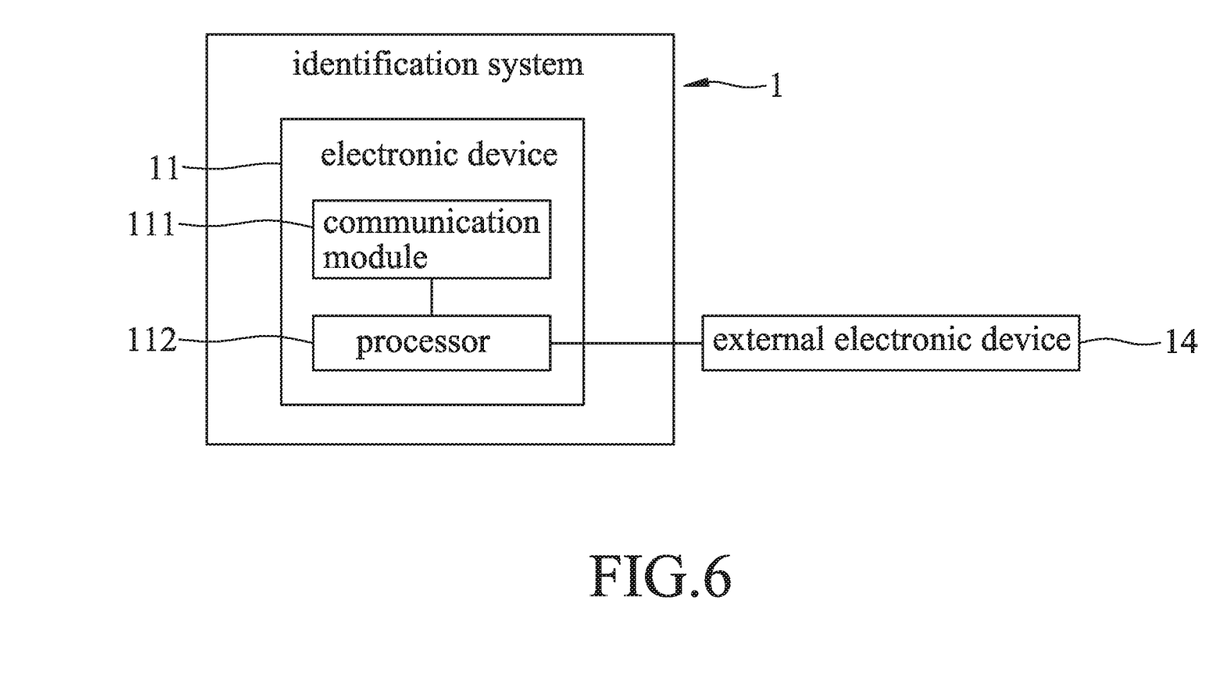
FIG. 6 is a block diagram illustrating an identification system for generating a merged video file, according to one embodiment of the disclosure.

Referring to FIG. 6, the electronic device 11 of the identification system 1 may be in communication with an external electronic device 14 for receiving user-input instructions therefrom.

Figure 7:
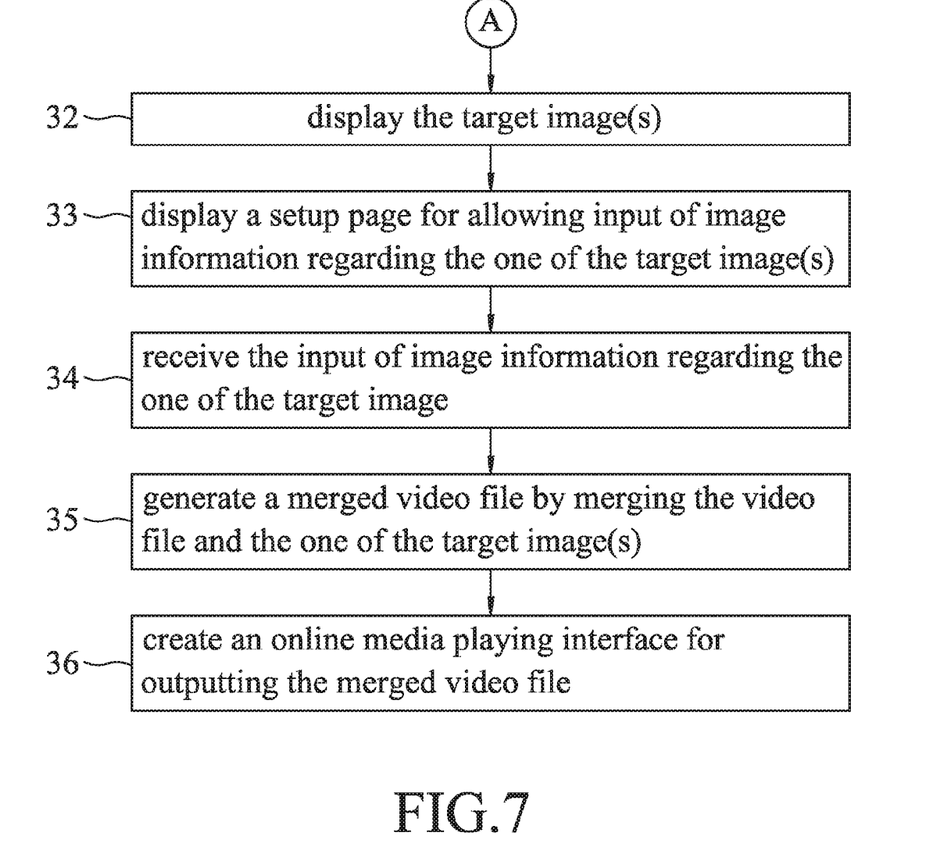
FIG. 7 is a flow chart illustrating steps of a method for generating the merged video file, according to one embodiment of the disclosure.

FIG. 7 illustrates of a method for generating the merged video.

In step 32, in response to an instruction from the external electronic device 14, the processor 112 generates a control signal and transmits the control signal to the external electronic device 14, in order to control the external electronic device 14 to display the target image(s) 52 obtained in step 28.

In one embodiment, the external electronic device 14 includes a display interface (not shown in the drawings) for receiving the user-input instructions therefrom, and in response to the instructions, displays the target image(s) 52 on the display interface.

In step 33, in response to receipt of an external trigger signal directed to one of the target image(s) 52, the processor 112 controls the external electronic device 14 to display a setup page 7 for allowing input of image information regarding the one of the target image(s) 52.

Figure 8:
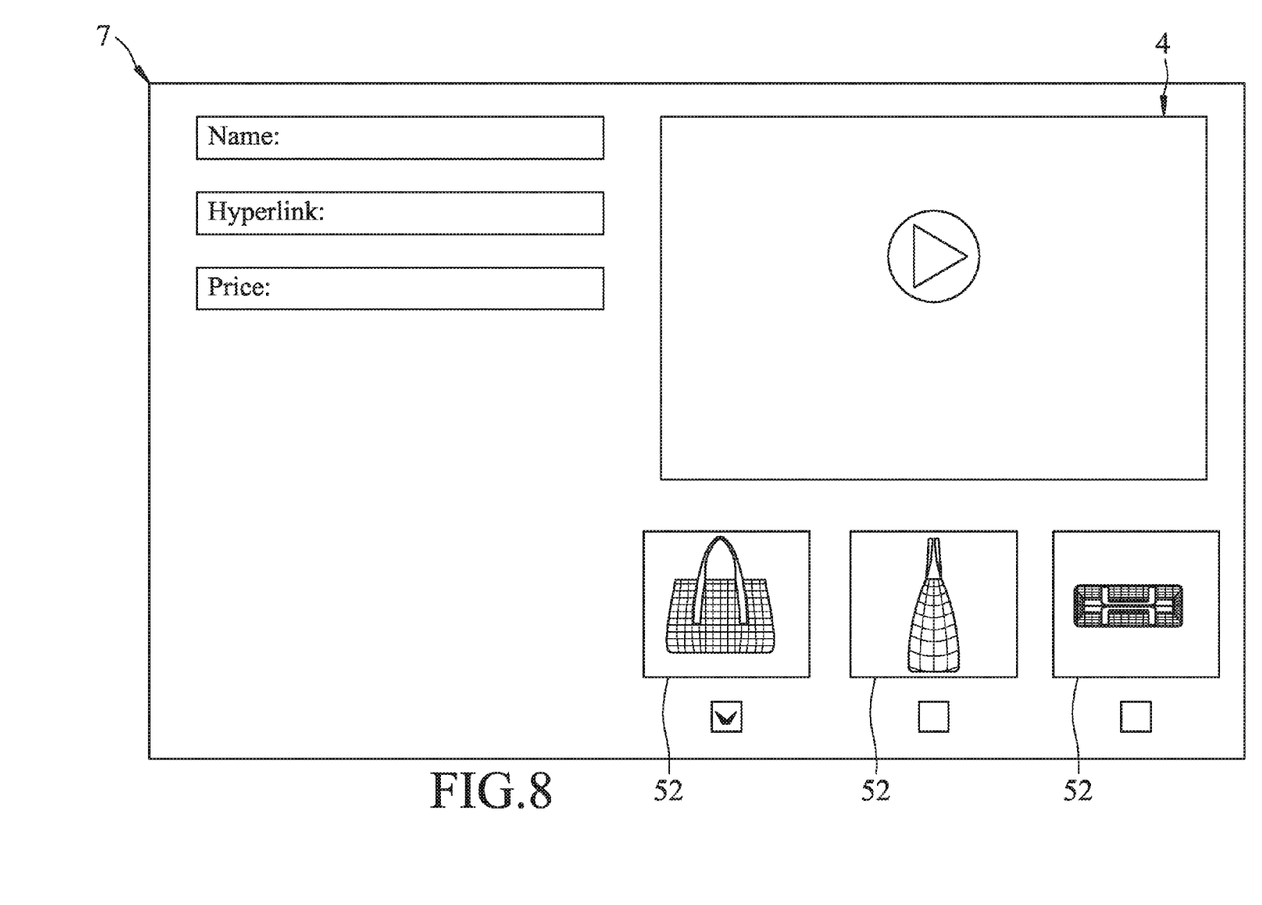
FIG. 8 illustrates a setup page for allowing input of image information regarding target image(s)

Referring to FIG. 8, the image information displayed in the setup page 7 may include the one of the target image(s) 52, the video file 4, a hyperlink to a website regarding the similar object 41 contained in the one of the target image(s) 52, a name of the similar object and a price of the similar object 41, etc.

In step 34, the processor 112 receives the input of image information regarding the one of the target image(s) 52. It is noted that in the case the image information regarding a plurality of target images 52 is desired to be available in the merged video, steps 33 and 34 may be repeated.

In step 35, the processor 112 generates a merged video file by merging the video file 4 and the one of the target image(s) 52.

In step 36, the processor 112 creates an online media playing interface 8 (see FIG. 9) for output of the merged video file. The processor 112 may control the communication module 111 to upload the online media playing interface 8 to a website or to embed the online media playing interface 8 into an application.

Figure 9:
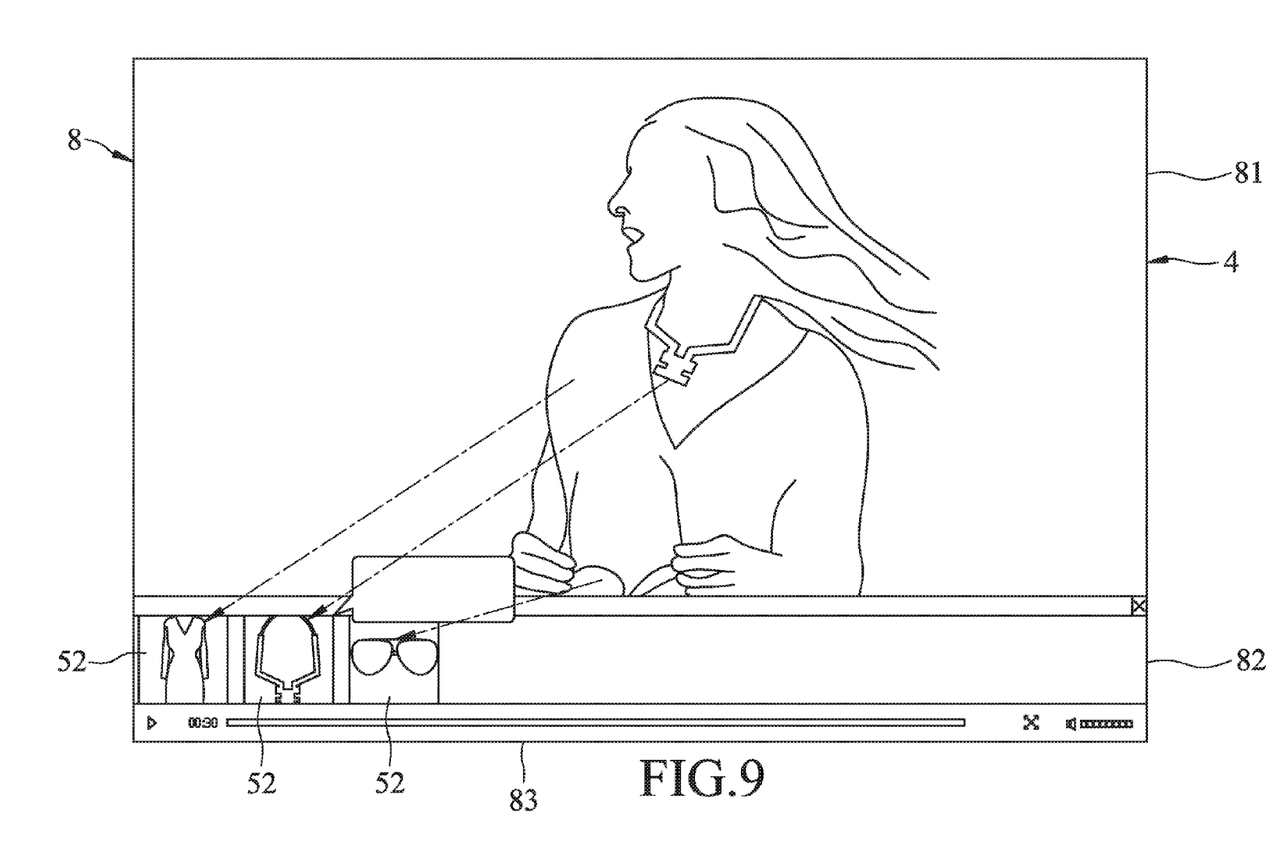
FIG. 9 illustrates an online media playing interface for outputting the merged video file.

As shown in FIG. 9, the online media playing interface 8 includes a first frame 81 for playback of the video file 4, and a second frame 82 for displaying the one of the target image(s) 52.

In one embodiment, the merged video file including multiple target images 52 may be created in a manner that when the video file 4 is being played in the first frame 81 of the online media playing interface 8, the target images 52 are displayed at respective time points in a time axis 83 of the video file 4 which is being played back.

In one alternative embodiment, the key frame may include a plurality of similar objects. Subsequently, a plurality of target images that correspond respectively with the plurality of similar objects are obtained. As a result, the merged video file may be created in a manner that when the video file 4 is being played in the first frame 81 of the online media playing interface 8, the target images 52 are simultaneously displayed in the second frame 82.

To sum up, the method as disclosed in the embodiments of the disclosure provides a way to identify, for a given image 51, a similar object 41 in any video file 4. Since the method does not require machine learning or a database to implement, it is noted that the method may be performed in a relatively efficient manner. In particular, a time for the method to complete may be as low as a portion (⅓ to ¼) of a duration of the video file 4. Moreover, the method is capable of handling a three-dimensional image to serve as the image 51, and therefore the applications of the method may be expanded.

Additionally, when a merged video file is generated, each of the target objects 52 that contains a similar object 41 is identified in respective time points of the video file 4, and allows the merged video file to be used in various applications (e.g., for commercial purposes).

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for identifying a target object in a video file, the method being implemented using an identification system and comprising the steps of:
    a1) obtaining a video file from one of a storage external to and coupled with the identification system and a video recording device;
    a2) obtaining an image inputted by a user;
    b) performing edge detection on the image so as to obtain a target object;
    c) detecting at least one feature of the target object, constructing an image model based on the at least one feature of the target object, and obtaining a contour of the image model;
    d) extracting a plurality of key frames indicating transitions in the video file from the video file sequentially;
    e) performing a comparing procedure for each of the plurality of key frames to make a determination as to whether the key frame includes a similar object that corresponds to the image model including when there exists a to-be-compared object in the key frame, calculating a degree of similarity between the to-be-compared object and the contour of the image model, when the degree of similarity is larger than a preset threshold, detecting an image feature of the to-be-compared object, comparing the image feature of the to-be-compared object and the image model, and determining, when it is determined that the image feature of the to-be-compared object conforms with the image model, the to-be-compared object as the similar object; and
    f) for each of the plurality of key frames, extracting from the key frame, when a result of the determination made in step e) is affirmative, a part of the key frame that contains the similar object to obtain a target image, presence of the target image indicating that the target object is identified in the video file.

2. The method of claim 1,
    wherein step d) includes, for each of the plurality of key frames, storing a time instance of the key frame associated with the video file; and
    wherein step f) includes obtaining a time point of the target image within the video file based on the time instance of the key frame from which the target image is obtained.

3. The method of claim 1, wherein, in step c), the image model is a three-dimensional model, and in step e), the comparing procedure is performed for determining whether the key frame includes the similar object that corresponds to the image model observed at any angle.

4. The method of claim 1, wherein the present threshold is 50%.

5. The method of claim 1, wherein in step c), the at least one feature of the target object is detected using speeded up robust features (SURF) detector.

6. The method of claim 1, further comprising, after step f), the steps of:
- g) generating a merged video file by merging the video file and the target image(s) obtained in step f); and
- h) creating an online media playing interface for output of the merged video file, the online media playing interface including a first frame for playback of the video file, and a second frame for displaying the target image(s).

7. The method of claim 6, wherein:
in step d), for each of the plurality of key frames, the identification system stores a time instance of the key frame associated with the video file;
in step f), the identification system obtains a time point of the target image within the video file based on the time instance of the key frame; and
in step g), the merged video file is created in a manner that when outputted in the online media playing interface, the target image is displayed at the time point in a time axis of the video file which is being played back.

8. The method of claim 6, wherein:
in step e), the key frame includes a plurality of similar objects;
in step f), a plurality of target images that correspond respectively with the plurality of similar objects are obtained; and
in step g), the merged video file is created in a manner that when outputted in the online media playing interface, the plurality of target images are simultaneously displayed in the second frame.

9. The method of claim 6, subsequent to step f) and prior to step g), further comprising the steps of:
displaying the target image(s) obtained in step f); and
in response to receipt of an external trigger signal directed to the target image(s), displaying a setup page for allowing input of image information regarding the target image(s).

10. The method of claim 9, wherein the image information includes one or more of a hyperlink to a website regarding the similar object contained in the target image, a name of the similar object and a price of the similar object.

11. The method of claim 1, wherein the image is a three-dimension image.

* * * * *